(12) United States Patent
Worms et al.

(10) Patent No.: US 10,754,013 B2
(45) Date of Patent: Aug. 25, 2020

(54) METHOD AND CONTROL UNIT FOR CONTROLLING AN EMITTED LIGHT OUTPUT OF A LIGHT SOURCE OF AN OPTICAL SENSOR SYSTEM

(71) Applicant: Robert Bosch GmbH, Stuttgart (DE)

(72) Inventors: Kai Worms, Hardthausen am Kocher (DE); Ernst Kretzek, Pforzheim (DE); Timo Knecht, Mundelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/517,869

(22) Filed: Jul. 22, 2019

(65) Prior Publication Data
US 2020/0033447 A1 Jan. 30, 2020

(30) Foreign Application Priority Data

Jul. 27, 2018 (DE) .......................... 10 2018 212 529

(51) Int. Cl.
*G01S 7/484* (2006.01)
(52) U.S. Cl.
CPC .................................... *G01S 7/484* (2013.01)
(58) Field of Classification Search
CPC .......... G01S 17/00; G01S 17/14; G01S 17/26; G01S 17/88; G01S 7/783; G01S 7/4804; G01S 7/4873; G01S 7/484; G01S 7/4868; G01S 7/497; H05B 45/10; H05B 45/22; H05B 45/48
See application file for complete search history.

(56) References Cited

U.S. PATENT DOCUMENTS

| | | | |
|---|---|---|---|
| 6,567,171 B1* | 5/2003 | Rushing | G01N 21/5907 356/432 |
| 8,258,855 B2* | 9/2012 | Come | H05B 45/37 327/518 |
| 8,317,347 B2* | 11/2012 | Gladnick | G01J 3/10 362/231 |
| 8,618,737 B2* | 12/2013 | Welten | H05B 45/22 315/153 |
| 9,874,635 B1* | 1/2018 | Eichenholz | G01S 7/4811 |
| 9,880,281 B2* | 1/2018 | Gilliland | G01S 7/4868 |
| 10,003,168 B1* | 6/2018 | Villeneuve | H01S 3/06733 |

* cited by examiner

*Primary Examiner* — Haissa Philogene
(74) *Attorney, Agent, or Firm* — Norton Rose Fulbright US LLP; Gerard Messina

(57) ABSTRACT

A method for controlling an emitted light output of a light source of an optical sensor system, in which a portion of the emitted light output is represented in an electrical signal, a characteristic variable of the signal representing a pulse energy of an emitted light pulse is determined, and a control signal for the light source is provided using the characteristic variable and a setpoint value of the characteristic variable.

9 Claims, 3 Drawing Sheets

METHOD AND CONTROL UNIT FOR CONTROLLING AN EMITTED LIGHT OUTPUT OF A LIGHT SOURCE OF AN OPTICAL SENSOR SYSTEM

CROSS REFERENCE

The present application claims the benefit under 35 U.S.C. § 119 of German Patent Application No. DE 102018212529.5 filed on Jul. 27, 2018, which is expressly incorporated herein by reference in its entirety.

FIELD

The present invention relates to a method for controlling an emitted light output of a light source of an optical sensor system and to a control unit for controlling an emitted light output of a light source of an optical sensor system.

BACKGROUND INFORMATION

In order to avoid injuries to the eye caused by light beams, safety regulations define limit values that must be observed by light sources such as laser light sources, in particular. In sensor systems these limit values can be observed by a conservative configuration, but a detection range of these sensor systems is limited.

SUMMARY

The present invention provides a method for controlling an emitted light output of a light source of an optical sensor system and a control unit for controlling an emitted light output of a light source of an optical sensor system, and it ultimately also provides a corresponding computer program product and a machine-readable memory medium.

Advantageous developments of and improvements of the present invention are described herein.

Embodiments of the present invention may advantageously allow for an adjustment of an emitted light output of a light source or a pulse energy of a light pulse close to an upper limit specified by safety regulations. This makes it possible to optimize a detection range of a sensor system.

A method for controlling an emitted light output of a light source of an optical sensor system is provided, which is characterized in that a portion of the emitted light output is represented in an electrical signal, a characteristic variable of the signal is determined which represents a pulse energy of an emitted light pulse, and a control signal for the light source is provided using the characteristic variable and a setpoint value of the characteristic variable.

Other embodiments of the present invention may be considered to be based, among other things, on the thoughts and recognitions described herein.

A light source may be understood as a laser light source. The light source may be operated in a pulsed manner. The light source emits light having a luminous power. A light pulse has a pulse energy that results from a characteristic of the light output. A portion of the light output may be diverted from a main beam, e.g., by scattering and/or deflection. For example, a partially transparent mirror may be placed in the main beam, which deflects the portion toward the side. A sensor element is able to convert the portion into an electrical signal. For example, the sensor element may be a photodiode. A characteristic variable may be a characteristic measurable quantity. A control signal is able to be generated by a controller using a setpoint-actual comparison. The pulse energy may be directly determined with the aid of an integrator. The integrator is able to sum up the light output represented in the electrical signal and to supply the integral of the light output representing the pulse energy.

At least one further characteristic variable of the electrical signal may be determined. As an alternative or in addition, at least one further portion of the emitted light output is able to be represented in at least one further electrical signal. At least one further characteristic variable of the further signal may be determined. The control signal may be determined using the further characteristic variable and a further setpoint value of the further characteristic variable. An improved detection accuracy of the pulse energy is achievable when using a plurality of characteristic variables. Different characteristic variables may be determined based on different electrical signals from different sensor elements.

An instantaneous value of the light output is able to be determined as the characteristic variable. The instantaneous value may be determined by a direct digitization of the electrical signal using an analog/digital converter featuring a high scanning rate. With the aid of the direct digitization, for example, a pulse length of a light pulse, a pulse form of a light pulse, a maximum value of the light output of a light pulse, the pulse energy of a light pulse, and/or a mean value of the light output of a light pulse is/are able to be determined.

A peak value of the light output may be determined as the characteristic variable. A peak value is able to be determined with the aid of a peak value detector. The peak value detector stores the maximum value of the light output of a light pulse. If a pulse form of the light pulses is known, i.e. a characteristic of the light output in relation to the peak value, then the pulse energy of an individual light pulse is able to be determined using the peak value.

A time period of an emitted light pulse may be determined as the characteristic variable. The time period is able to be detected when an instantaneous value of the light output is greater than a threshold value. A time duration may be determined via a time measurement with the aid of at least one comparator. When the light output exceeds the threshold value, the time measurement may be started. When the light output drops below the threshold value, the time measurement may be stopped and the time period be output.

An edge steepness of an emitted light pulse is able to be determined as a characteristic variable. An edge steepness may be detected at a rising edge and/or a falling edge of a light pulse. The edge steepness is able to be determined by a time measurement between the exceeding and/or undershooting of two different threshold values. The second threshold value may be monitored via a second comparator.

An offset of the electrical signal is able to be corrected in order to determine the pulse energy. The integrator may supply an erroneous result when the signal has an offset. A correction circuit is able to compensate for the offset.

For example, the present method may be implemented in software or hardware or in a mixed form of software and hardware, e.g., in a control unit.

The approach presented here furthermore provides a control unit for controlling an emitted light output of a light source of an optical sensor system, which is configured to execute, actuate or implement the steps of a variant of the method provided here in different devices.

The control unit may be an electrical device having at least one processing unit for processing signals or data, at least one memory unit for storing signals and data, and at least one interface and/or one communications interface for reading in or outputting data which are embedded in a communications protocol. The processing unit, for example, may be a signal processor, a so-called system ASIC, or a microcontroller for processing sensor signals and outputting data signals as a function of the sensor signals. The memory unit may be a flash memory, an EPROM or a magnetic memory unit, for example. The interface is able to be developed as a sensor interface for reading in the sensor signals from a sensor, and/or as an actuator interface for outputting the data signals and/or control signals to an actuator. The communications interface may be developed to read in or output the data in a wireless and/or wire-bound manner. The interfaces may also be software modules, which are provided on a microcontroller in addition to other software modules, for instance.

Also advantageous is a computer program product or computer program having program code, which may be stored on a machine-readable carrier or memory medium, e.g., a semiconductor memory, a hard disk or an optical memory, and which is used to execute, implement and/or actuate the steps of the present method as recited in one of the previously described embodiments, in particular when the program product or program is executed on a computer or a device.

It is pointed out that a few of the possible features and advantages of the present invention are described herein with reference to different embodiments. One skilled in the art will recognize that the features of the device and the control unit may be suitably combined, adapted or exchanged in order to obtain further embodiments of the present invention.

BRIEF DESCRIPTION OF THE DRAWINGS

Below, example embodiments of the present invention are described with reference to the figures, but neither the figures nor the description should be interpreted as limiting the present invention.

The figures are merely schematic and not true to scale. Identical reference numerals in the figures denote identical or equivalent features.

DETAILED DESCRIPTION OF EXAMPLE EMBODIMENTS

In highly automated driving functions (HAF), the responsibility is increasingly shifted from the driver to the vehicle. The realization requires highly reliable sensor systems featuring a virtually uninterrupted and fault-free detection of the vehicle environment. Such a sensor system may be developed on the basis of the laser radar principle (LiDAR). A LiDAR essentially is based on the measurement of the time between the emission of a pulse and the reception of a reflection at an object to be detected.

The range of a LiDAR decisively depends on the pulse output of the laser which, however, is limited by eye safety standards. The pulse energy varies with the temperature, ageing and component scattering and is therefore unknown. For example, a safety margin may be observed which takes all possible influences on the pulse energy into account. This reduces the range. In a LiDAR sensor without independent monitoring of the pulse energy in order to ensure eye safety, it is also possible to work with a transmission path of the laser class 1, it being assumed that the technical measures regarding the firing sequence and the output are functioning correctly.

Furthermore, the eye safety may be at risk when the transmission unit emits laser output during an unanticipated time interval. Possible reasons may be existing errors as well as suddenly occurring defects in software and hardware.

In accordance with the present invention, the emerging pulse energy is measured. This makes it possible to ensure eye safety. Toward this end, the laser power is ascertained using a photodiode, for example. For instance, this may be done by deflecting a small portion of the beam via a transparent surface, but also by a direct detection of scattered light. A signal processing unit ascertains the pulse energy. Based on this value, the laser is able to be operated at the highest possible power while ensuring eye safety.

Figure 1:
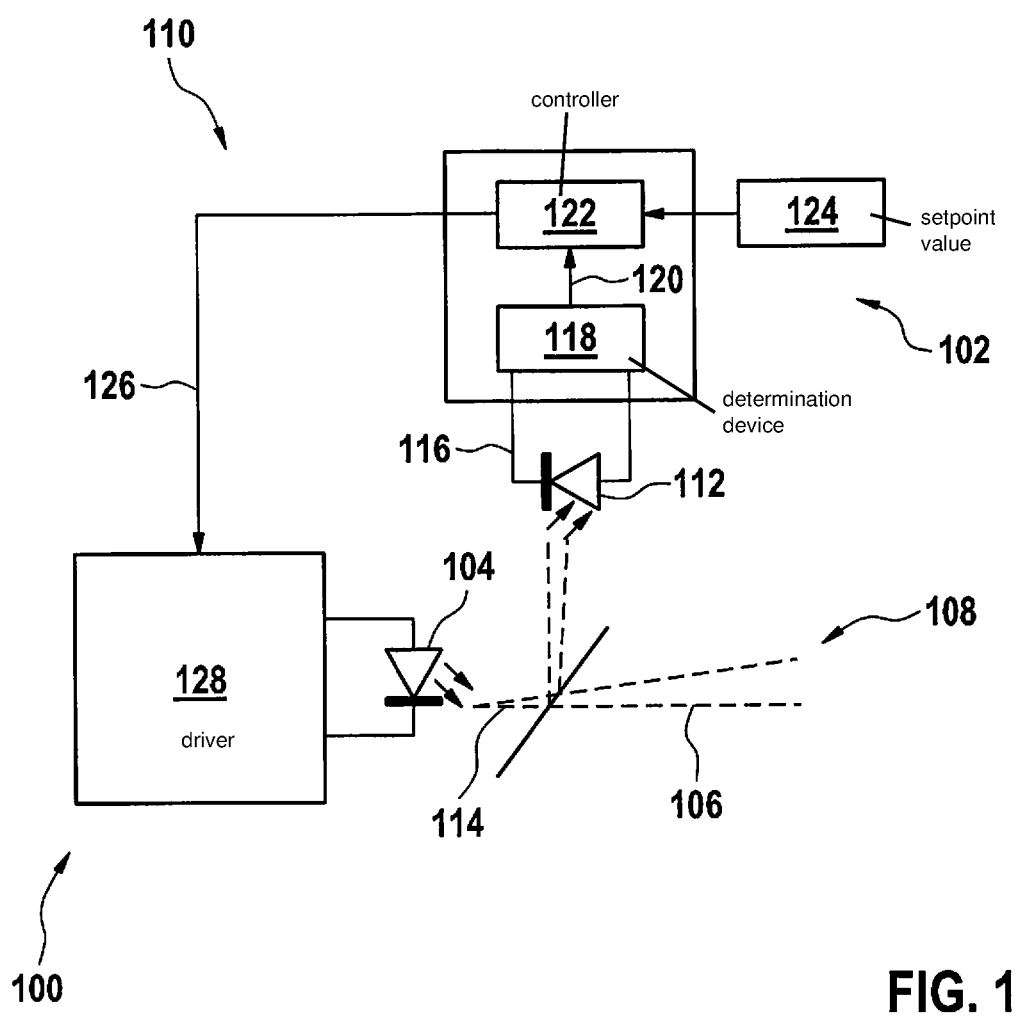
FIG. 1 shows a block diagram of an optical sensor system having a control unit according to one exemplary embodiment.

FIG. 1 shows a block diagram of an optical sensor system 100 having a control unit 102 according to one exemplary embodiment. Sensor system 100 may be a LiDAR system, for instance. Using a light source 104, e.g., a laser diode, sensor system 100 emits light 106 in a detection range of sensor system 100. Light 106 illuminates objects in the detection range. Light 106 is reflected at the objects and returned to sensor system 100 in the form of reflections. Sensor system 100 emits light 106 as light pulses 108. The reflections are received in sensor system 100 and a distance from the illuminated objects is ascertained from a propagation time between the emission of a light pulse 108 and the receiving of the reflection.

Only one transmission path 110 of sensor system 100 is illustrated here.

A sensor element 112 of control unit 102 is situated in transmission path 110 in the sensor system 100 introduced here. Sensor element 112 is developed to represent a portion of an emitted light output 114 of emitted light 106 in an electrical signal 116. A determination device 118 of control unit 102 is developed to determine a characteristic variable 120 of signal 114 representing a pulse energy of an emitted light pulse 108. A controller 122 of control unit 102 is developed to supply a control signal 126 for light source 104 using characteristic variable 120 and a setpoint value 124 of characteristic variable 120.

For example, setpoint value 124 is mandated by legal provisions in connection with eye safety. If characteristic variable 120 is smaller than setpoint value 124, then control signal 126 is supplied in such a way that emitted light power 114 will be increased.

A driver 128 of light source 104 processes control signal 126 and adjusts light pulses 108 in accordance with control signal 126.

In other words, a unit for ensuring the eye safety of LiDARs of autonomous vehicles is provided. The monitoring of the pulse energy is carried out with the aid of a photodetector. Toward this end, a small portion of the laser output is guided onto a photodiode.

Figure 2:
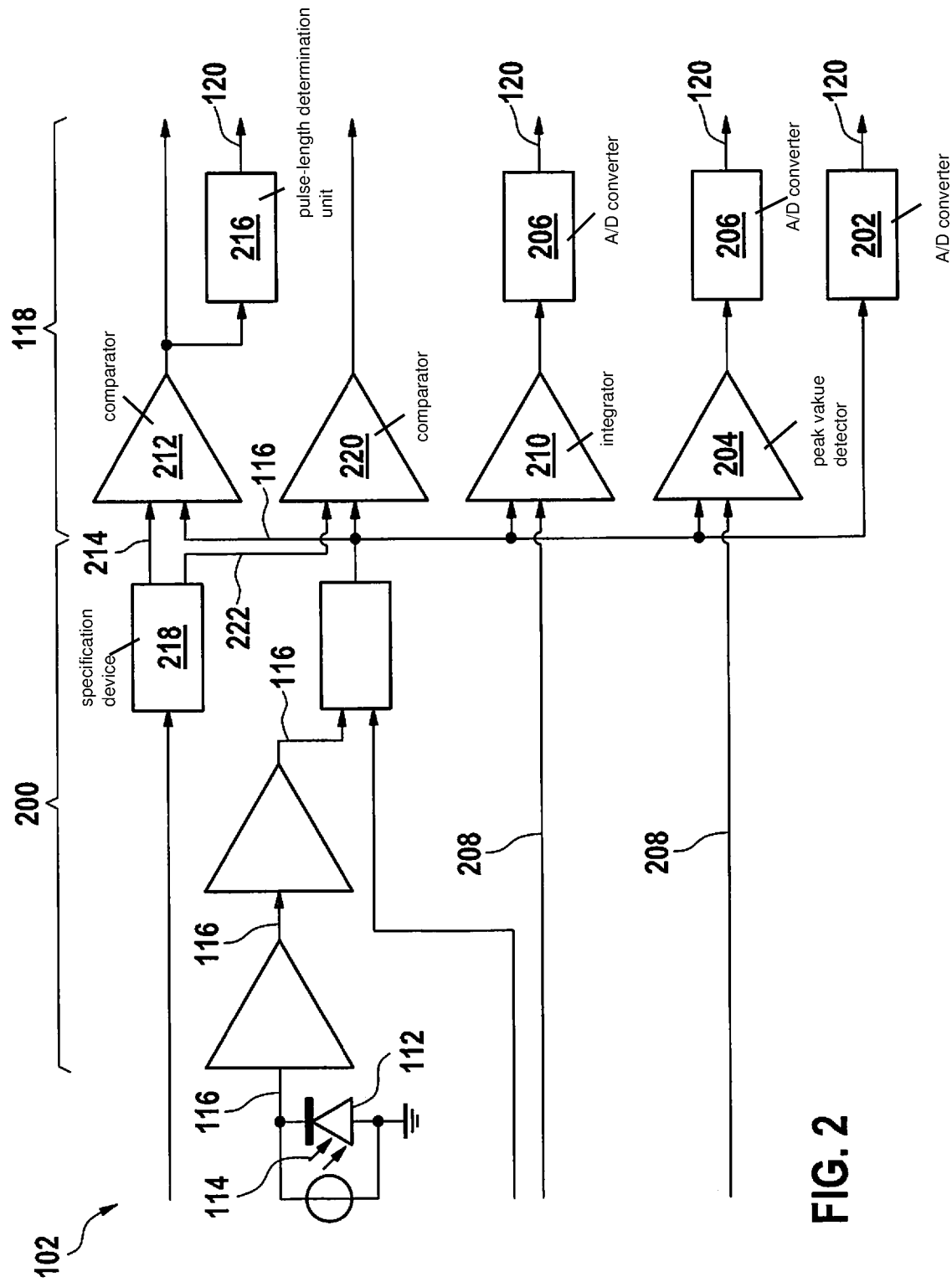
FIG. 2 shows a partial block diagram of a determination device of a control unit according to one exemplary embodiment.

FIG. 2 shows a partial block diagram of determination device 118 of a control unit 102 according to one exemplary embodiment. Determination device 118 essentially corresponds to the determination device in FIG. 1. Similar to FIG. 1, the sensor element represents a value of light output 114 in an electrical quantity of signal 116. Using signal 116, determination device 118 determines at least one characteristic variable 120. In the controller, which is not shown here, at least one characteristic variable 120 is compared to the corresponding setpoint value and the control signal for the light source is provided using a result of the comparison.

In one exemplary embodiment, signal 116 is conditioned in a signal-processing device 200 in such a way that the components of determination device 118 are able to use signal 116. For example, sensor element 112 represents an electric current flow in an electric voltage, the voltage is amplified and an offset of the voltage is compensated for before signal 116 is used in determination device 118.

In one exemplary embodiment, determination device 118 has a rapid analog/digital converter 202 which digitizes a value of the electrical voltage of signal 116 at a high scanning rate and represents it in data words. The data words thus represent a value of the currently emitted light output 114 as characteristic variable 120.

In one exemplary embodiment, determination device 118 has a peak value detector 204. Peak value detector 204 registers the highest value of the voltage of signal 116 within a time period. After the time period, an electric voltage that represents the highest value is applied as characteristic variable 120 at an output of peak value detector 204 and is able to be digitized by a downstream simple analog/digital converter 206.

Peak value detector 204 is reset following the time period via a reset signal 208 and is available for a further measurement.

In one exemplary embodiment, determination device 118 has an integrator 210. Integrator 210 integrates the electrical voltage of signal 116 across a time period. At the end of the time period, an electrical voltage that represents an integral of the voltage is applied at an output of integrator 210 as characteristic variable 120 and is able to be digitized by a further downstream simple analog/digital converter 206.

Integrator 210, too, is reset following the time period using a reset signal 208 and is then available for a further measurement.

In one exemplary embodiment, determination device 118 has a comparator 212. Comparator 212 compares the electrical voltage of signal 116 to a threshold value 214. If the voltage is greater than threshold value 214, then an output of comparator 212 changes its status. The change is registered by a pulse-length determination unit 216. When the voltage is smaller than threshold value 214 again, the output changes back to its original status. This change, too, is registered by pulse-length determination unit 216. A time period between the changes thus represents a pulse length of the light pulse and is provided by pulse-length determination unit 216 as characteristic variable 120.

Threshold value 214 is supplied by a specification device 218.

In one exemplary embodiment, determination device 118 has a further comparator 220. Further comparator 220 compares the electrical voltage of signal 116 to a further threshold value 222. If the voltage is greater than further threshold value 222, an output of further comparator 220 changes its status. In this case, too, further threshold value 222 is specified by specification device 218.

Further threshold value 222 may be greater than threshold value 114. A time offset between the changing instants of the outputs thus comes about both when the voltage rises and when the voltage drops. On the basis of this offset and a difference between threshold values 214, 222, an edge steepness of the light pulse is able to be determined as the characteristic variable.

In other words, FIG. 2 shows the photodetector together with an exemplary front end of the signal-processing unit.

The current of the photodetector is able to be converted into a voltage with the aid of a transimpedance amplifier (TIA) and be amplified by an optional secondary amplifier (Amp) in order to achieve the signal level required by the downstream components. An offset of the signal is able to be corrected in an offset correction.

The pulse energy is now able to be ascertained with the aid of a number of different methods.

One method is based on the direct digitization of the pulse and the integration in a digital logic unit. However, this requires a rapid and thus expensive analog-to-digital converter (ADC).

If the form of the pulse is known, then its energy is also able to be determined with the aid of a peak value detector or peak detector. The peak value detector stores the maximum value of the past signal, which subsequently is able to be digitized with the aid of a relatively slow analog-to-digital converter. Prior to transmitting a laser pulse, the peak value detector is reset to the zero amplitude. The scanning rate of the analog-to-digital converter, and thus its cost, is able to be considerably reduced when using this method. However, the peak value detector is unable to detect whether the emitted pulse has the intended length.

In order to detect the length, comparators may be used whose threshold values are able to be set by one or a plurality of digital-to-analog converter(s). Using the comparators and a unit for ascertaining the pulse length, it is possible to determine the pulse length. Moreover, monitoring may be carried out with the aid of the comparators in order to determine whether a light pulse was emitted from the transmission path during an unexpected time interval. In addition, the threshold values of the comparators are able to be adapted to a suitable value based on the ascertained maximum value.

One particularly advantageous method for determining the pulse energy is the integration of the signal over the time. The integrator may have a reset function in this case, via which the integrator output is reset to a known value immediately prior to the transmission of a laser pulse. After the laser pulse has been transmitted, the integration result is digitized by an analog-to-digital converter. The integrator is sensitive to a signal offset, which may be created by upstream amplifiers, for example. The offset is able to be removed by an active correction circuit or a high-pass filter.

Figure 3:
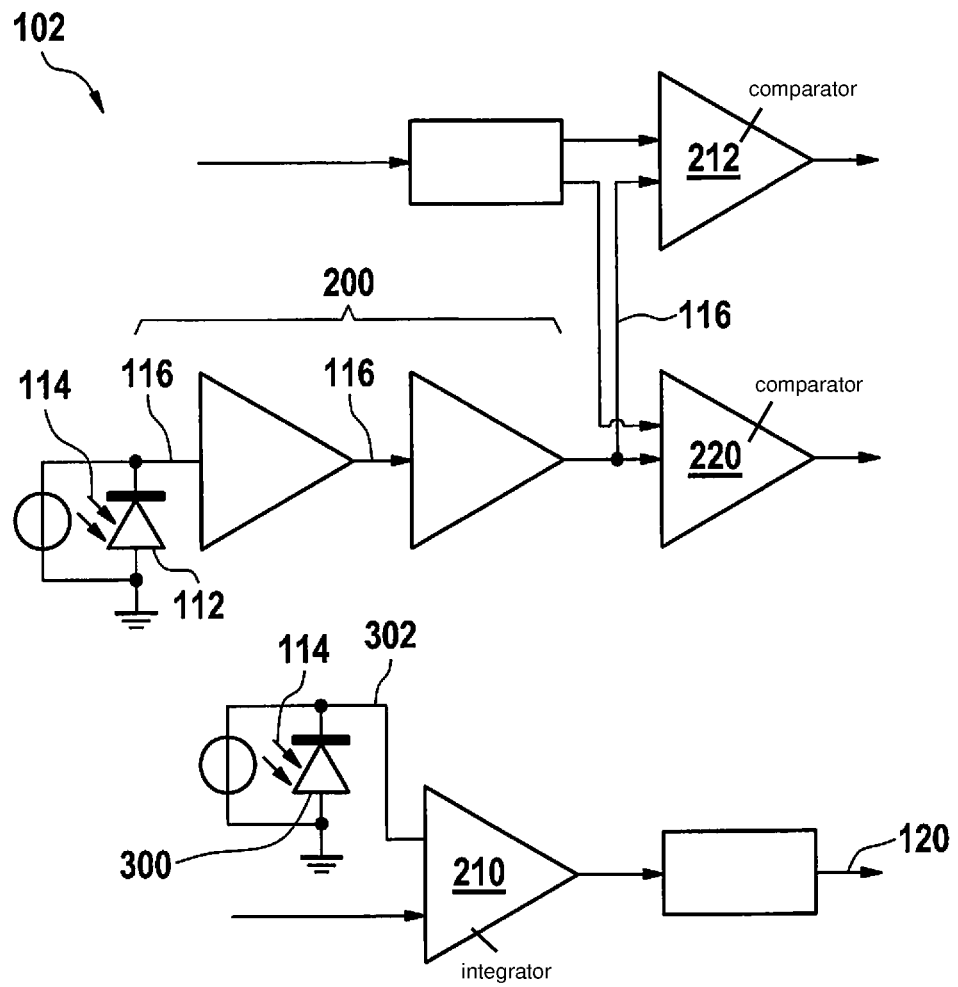
FIG. 3 shows a partial block diagram of a multi-channel determination device of a control unit according to one exemplary embodiment.

FIG. 3 shows a partial block diagram of a multi-channel determination device 118 according to one exemplary embodiment. Determination device 118 essentially corresponds to determination device 118 in FIG. 2 and has an integrator 210 and two comparators 212, 220. In contrast to the illustration in FIG. 2, determination device 118 has no high-resolution analog/digital converter and no peak value detector in this instance. Sensor element 112 is connected via signal-processing device 200 to comparators 212, 220. Similar to FIG. 2, signal-processing device 200 supplies signal 116 as an electrical voltage.

In addition to the illustration in FIG. 2, determination device 118 shown here includes a second sensor element 300. Second sensor element 300 represents a second portion of emitted light output 114 in a second electrical signal 302. Second signal 302 essentially is an electrical current flow. Second sensor element 302 is directly connected to integrator 210.

Integrator 210 integrates second signal 302 in order to sum up the pulse energy emitted within a measuring period as characteristic variable 120.

In other words, FIG. 3 shows an alternative configuration with two photodiodes. One photodiode is used for detecting the presence of a pulse and its length with the aid of comparators. A further photodiode is connected, without a transimpedance amplifier, to an integrator. In this arrangement, the integrator may also be operated using a photodiode with a relatively large active surface, which simplifies the calibration of the optics system. In addition, the accuracy of the pulse energy determination is maximized because the tolerances of the transimpedance amplifier and the optional secondary amplifier are omitted.

The application field of the approach presented here includes at least 2D and 3D lidar sensors for an environment detection for driver assistance systems. In addition, the approach introduced here is able to be used in all pulsed lasers for measuring purposes in areas that are accessible to persons.

In closing it should be pointed out that terms such as 'having', 'including' etc. do not exclude any other elements or steps, and terms like 'a' do not exclude a plurality.

What is claimed is:

1. A method for controlling an emitted light output of a light source of an optical sensor system, the method comprising:
   representing a portion of the emitted light output in an electrical signal;
   determining a characteristic variable of the signal representing a pulse energy of an emitted light pulse;
   providing a control signal for the light source using the characteristic variable and a setpoint value of the characteristic variable;
   determining at least one further characteristic variable of the electrical signal; and
   determining the control signal using the further characteristic variable and a further setpoint value of the further characteristic variable.

2. The method as recited in claim 1, wherein an offset of the electrical signal is corrected in order to determine the pulse energy.

3. The method as recited in claim 1, wherein an instantaneous value of the light output is determined as the characteristic variable.

4. The method as recited in claim 1, wherein a peak value of the light output is determined as the characteristic variable.

5. The method as recited in claim 1, wherein an edge steepness of an emitted light pulse is determined as the characteristic variable.

6. A method for controlling an emitted light output of a light source of an optical sensor system, the method comprising:
   representing a portion of the emitted light output in an electrical signal;
   determining a characteristic variable of the signal representing a pulse energy of an emitted light pulse; and
   providing a control signal for the light source using the characteristic variable and a setpoint value of the characteristic variable;
   wherein a time period of an emitted light pulse is determined as the characteristic variable, and the time period is detected when an instantaneous value of the light output is greater than a threshold value.

7. A non-transitory machine-readable memory medium on which is stored a computer program, which is executable by a processor, comprising:
   a program code arrangement having program code for controlling an emitted light output of a light source of an optical sensor system, by performing the following:
      representing a portion of the emitted light output in an electrical signal;
      determining a characteristic variable of the signal representing a pulse energy of an emitted light pulse;
      providing a control signal for the light source using the characteristic variable and a setpoint value of the characteristic variable;
      determining at least one further characteristic variable of the electrical signal; and
      determining the control signal using the further characteristic variable and a further setpoint value of the further characteristic variable.

8. A method for controlling an emitted light output of a light source of an optical sensor system, the method comprising:
   representing a portion of the emitted light output in an electrical signal;
   determining a characteristic variable of the signal representing a pulse energy of an emitted light pulse;
   providing a control signal for the light source using the characteristic variable and a setpoint value of the characteristic variable;
   representing at least one further portion of the emitted light output in at least one further electrical signal;
   determining at least one further characteristic variable of the further signal; and
   determining the control signal using the further characteristic variable and a further setpoint value of the further characteristic variable.

9. An apparatus to control an emitted light output of a light source of an optical sensor system, comprising:
   a control unit configured to perform the following:
      representing a portion of the emitted light output in an electrical signal;
      determining a characteristic variable of the signal representing a pulse energy of an emitted light pulse;
      providing a control signal for the light source using the characteristic variable and a setpoint value of the characteristic variable;
      determining at least one further characteristic variable of the electrical signal; and
      determining the control signal using the further characteristic variable and a further setpoint value of the further characteristic variable.

* * * * *